United States Patent
Lipscomb et al.

(10) Patent No.: US 6,312,060 B1
(45) Date of Patent: Nov. 6, 2001

(54) DUAL MODE EMERGENCY BRAKING APPARATUS AND METHOD OF USE THEREOF

(75) Inventors: Jason Lipscomb, Sewickley; Joseph Zhou, Library, both of PA (US)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/576,307

(22) Filed: May 23, 2000

(51) Int. Cl.⁷ .............................. B60T 13/00; B60T 7/12; F16D 65/24
(52) U.S. Cl. .................. 303/9; 303/63; 188/170
(58) Field of Search .................. 188/106 F, 151 R, 188/170; 303/3, 7, 9, 15, 63

(56) References Cited

U.S. PATENT DOCUMENTS

| | | | |
|---|---|---|---|
| 3,759,357 | 9/1973 | Bianchetta | 192/3 R |
| 3,917,037 | 11/1975 | Prillinger | 188/170 |
| 3,999,075 * | 12/1976 | Johnson et al. | 303/63 |
| 4,033,629 | 7/1977 | Spalding | 303/2 |
| 4,226,306 | 10/1980 | Schäfer | 188/170 |
| 4,234,062 | 11/1980 | Kerscher et al. | 188/170 |
| 4,361,078 | 11/1982 | Cape et al. | 92/31 |
| 4,478,318 | 10/1984 | Hayden | 188/72.4 |
| 4,592,597 | 6/1986 | Hommen et al. | 303/15 |
| 4,696,377 | 9/1987 | Richardson et al. | 188/170 |
| 4,722,575 | 2/1988 | Graham | 303/2 |
| 4,758,052 | 7/1988 | Bechman et al. | 303/9 |
| 4,792,192 | 12/1988 | Tveitane | 303/13 |
| 4,793,449 | 12/1988 | Smith | 188/107 |
| 4,795,005 | 1/1989 | Wirth | 188/153 R |
| 5,154,491 | 10/1992 | Graham | 303/6.01 |
| 5,203,616 * | 4/1993 | Johnson | 303/10 |
| 5,253,736 | 10/1993 | Kohler | 188/59 |
| 5,456,523 | 10/1995 | Boehringer | 303/13 |
| 5,458,403 * | 10/1995 | Moody | 303/7 |

* cited by examiner

Primary Examiner—Christopher P. Schwartz
(74) Attorney, Agent, or Firm—Webb Ziesenheim Logsdon Orkin & Hanson, P.C.

(57) ABSTRACT

A dual mode brake system includes a first fluid actuated brake and a second spring actuated fluid released brake configured to spring actuate the first brake in the absence of receiving sufficient fluid pressure at the second brake. A first fluid control circuit variably supplies fluid to the first brake from a source of pressurized fluid. A second fluid control circuit controllably supplies fluid to the second brake from the source of pressurized fluid. The third fluid control circuit controllably supplies fluid to the second brake based on the pressure of the fluid received by the third fluid control circuit from the first fluid control circuit and the pressure of the fluid received by the third fluid control circuit from the second fluid control circuit.

20 Claims, 7 Drawing Sheets

FIG.2 BRAKE RELEASE

SERVICE BRAKING

PRESSURE EMERGENCY BRAKING
SPRING BRAKE HELD OFF

SPRING EMERGENCY BRAKING
PRESSURE EMERGENCY BRAKE FAILED
TO BUILD SUFFICIENT PRESSURE

DUAL MODE EMERGENCY BRAKING APPARATUS AND METHOD OF USE THEREOF

BACKGROUND OF THE INVENTION

1. Field of the Invention

The present invention relates to fluid powered brake systems and, more particularly, to fluid powered brake systems used with automated people movers.

2. Background Art

An electrically powered automated people mover typically includes a propulsion system connected to a source of electrical power for propelling the people mover on running rails or along a predetermined path. Such people movers often include a fluid actuated brake system that is utilized to de-accelerate the people mover when it is moving and/or to maintain the people mover stationary during passenger loading and unloading. Because such people mover is automated, there is a need to provide braking in the event of a failure of the braking control system that controls the flow of fluid to a friction brake of the people mover.

It is, therefore, an object of the present invention to provide a brake system and a method of use thereof which provides a brake release mode, a service braking mode and a pressure emergency braking mode under normal, fluid braking operation and which provides a spring emergency braking mode in the event that one or more components of the brake system utilized for normal fluid braking operation fail. Still other objects of the present invention will become apparent to those of ordinary skill in the art upon reading and understanding the following detailed description.

SUMMARY OF THE INVENTION

Accordingly, we have invented a dual mode brake system for a vehicle. The dual mode brake system includes a first fluid actuated brake and a second spring actuated fluid released brake configured to spring actuate the first brake in the absence of receiving sufficient fluid pressure at the second brake. A first fluid control circuit controllably supplies fluid to the first brake from a source of pressurized fluid and a second fluid control circuit controllably supplies fluid to the second brake from the source of pressurized fluid. A third fluid control circuit controllably supplies fluid to the second brake from the first fluid control circuit or the second fluid control circuit as a function of a pressure of the fluid supplied to the third fluid control circuit from the first fluid control circuit and a pressure of the fluid supplied to the third fluid control circuit from the second fluid control circuit.

A controller controls the first fluid control circuit and the second fluid control circuit. The first fluid control circuit variably controls the pressure of the fluid supplied thereby as a function of a first signal from the controller. The second fluid control circuit on/off controls the fluid supplied thereby as a function of a second signal from the controller. The third fluid control circuit on/off controls the fluid supplied to the second brake from the first fluid control circuit or the second fluid control circuit.

The first fluid control circuit includes a flow control valve connected between the source of pressurized fluid and the first brake for variably controlling the pressure of the fluid supplied from the source of pressurized fluid to the first brake as a function of a pressure of the fluid supplied to a control input of the flow control valve. A proportional valve is connected between the source of pressurized fluid and the control input of the flow control valve for variably controlling the pressure of the fluid supplied to the control input of the flow control valve as a function of the first signal. A first two-way valve can be connected to the flow control valve, the proportional valve and the source of pressurized fluid. The first two-way valve has a first position where the control input of the flow control valve is in fluid communication with the proportional valve and a second position where the control input of the flow control valve is in fluid communication with the source of pressurized fluid. The first two-way valve has a control input connected to receive a third signal from the controller. The third signal selectively switches the first two-way valve between the first position and the second position. Preferably, the first signal is continuously variable and the second and third signals are binary.

The first fluid control circuit preferably includes a pressure regulator in fluid communication between the control input of the fluid control valve and the source of pressurized fluid when the first two-way valve is in the second position. The pressure regulator reduces the pressure of the fluid supplied to the control input of the fluid control valve when the first two-way valve is in the second position.

The second fluid control circuit includes a second two-way valve connected between the source of pressurized fluid and the third fluid control circuit. The second two-way valve has a first position where the source of pressurized fluid is in fluid communication with the third fluid control circuit and a second position where the third fluid control circuit is fluidly isolated from the source of pressurized fluid. The second two-way valve has a control input connected to receive the second signal from the controller. The second signal selectively switches the second two-way valve between the first position and the second position.

The third fluid control circuit preferably includes a double check valve having: (i) one input connected to the second fluid control circuit; (ii) another input connected to the first fluid control circuit and the first brake; and (iii) an output connected to the second brake. The double check valve fluidly connects the input thereof receiving the greatest fluid pressure to the output of the double check valve.

The dual mode brake system can be operated in a brake release mode, a service braking mode, a pressure braking mode and a spring emergency braking mode. In the brake release mode, the first fluid control circuit withholds fluid from the first brake, and the second brake receives fluid from the second fluid control circuit via the third fluid control circuit. In the service braking mode, the first brake receives from the first fluid control circuit fluid having a pressure corresponding to a desired braking effort of the first brake, and the second brake receives fluid from the second fluid control circuit via the third fluid control circuit. Preferably, the pressure of the fluid received by the first brake is less than the pressure of the fluid received by the second brake. In the pressure emergency braking mode, the first brake receives fluid from the first fluid control circuit, the second brake receives fluid from the first fluid control circuit via the third fluid control circuit and the second fluid control circuit fluidly isolates the third fluid control circuit from the source of pressurized fluid. In the spring emergency braking mode, the first fluid control circuit and the second fluid control circuit do not supply sufficient fluid to the second brake to compress a spring thereof whereby the spring actuates the second brake which provides a spring braking effort.

The dual mode brake system enters the spring emergency braking mode when the second fluid control circuit withholds fluid from the third fluid control circuit and the first two-way valve malfunctions whereby the flow control valve does not supply sufficient fluid to the second brake to maintain the spring thereof compressed. Under this circumstance, the spring actuates the second brake which provides the spring braking effort. The malfunction of the first two-way valve can include a blockage in the fluid path between the control input of the flow control valve and the source of pressurized fluid when the two-way valve is in the second position.

The dual mode brake system can also enter the spring emergency braking mode when the second fluid control circuit withholds fluid from the third fluid control circuit and the flow control valve malfunctions whereby the flow control valve does not supply sufficient fluid to the second brake to maintain the spring compressed. Under this circumstance, the spring actuates the second brake which provides the spring braking effort. A first malfunction of the flow control valve includes a failure to initiate fluidly connecting the first brake and the third fluid control circuit to the source of pressurized fluid in response to receiving sufficient fluid at the control input of the flow control valve. A second malfunction of the flow control valve includes an blockage in the fluid path between (i) the source of pressurized fluid and (ii) the first brake and the third fluid control circuit when the flow control valve connects the first brake and the third fluid control circuit to the source of pressurized fluid in response to receiving sufficient fluid at the control input of the flow control valve.

We have also invented a method of controlling a dual mode braking system that includes a first fluid actuated brake and a second spring actuated fluid released brake. The method includes supplying a variable signal to the dual mode braking system and supplying fluid to the first fluid actuated brake along a first fluid path at a pressure related to a value of the variable signal. A first binary signal is supplied to the dual mode braking system. When the first binary signal is in one state, fluid is supplied to the second spring actuated fluid released brake along a second fluid path at a pressure sufficient to maintain the second brake in its release state.

The variable signal is preferably variable between a first valve where the pressure of the fluid in the first fluid path causes the first brake to apply a first braking effort and a second valve where the pressure of the fluid in the first fluid path causes the first brake to apply a second braking effort greater than the first braking effort.

When the first binary signal is in another state, fluid is withheld from the second fluid path and the second brake is fluidly connected to the first fluid path to maintain the second brake in its release state. If the pressure of the fluid supplied to the second brake is reduced sufficiently, the spring of the second brake actuates the second brake.

A second binary signal can be supplied to the dual mode braking system. When the second binary signal is in one state, fluid pressure in the first path is related to the value of the variable signal. When the second binary signal is in another state, fluid pressure in the first path is set to a fixed pressure. Preferably, the fixed pressure is less than or equal to the pressure of the fluid in the second fluid path.

DETAILED DESCRIPTION OF THE PREFERRED EMBODIMENT

The present invention will be described with reference to FIGS. 1–7 where like reference numbers correspond to like elements. In the FIGS. 2–7, fluid control elements connected by fluid lines lacking pressurized fluid are shown by thick, heavy lines and fluid lines having pressurized fluid therein are shown by narrow, light lines.

The present invention will be described with reference to an automated people mover, such as a light rail vehicle or a rubber-tired people mover. However, this is not to be construed as limiting the present invention.

Figure 1:
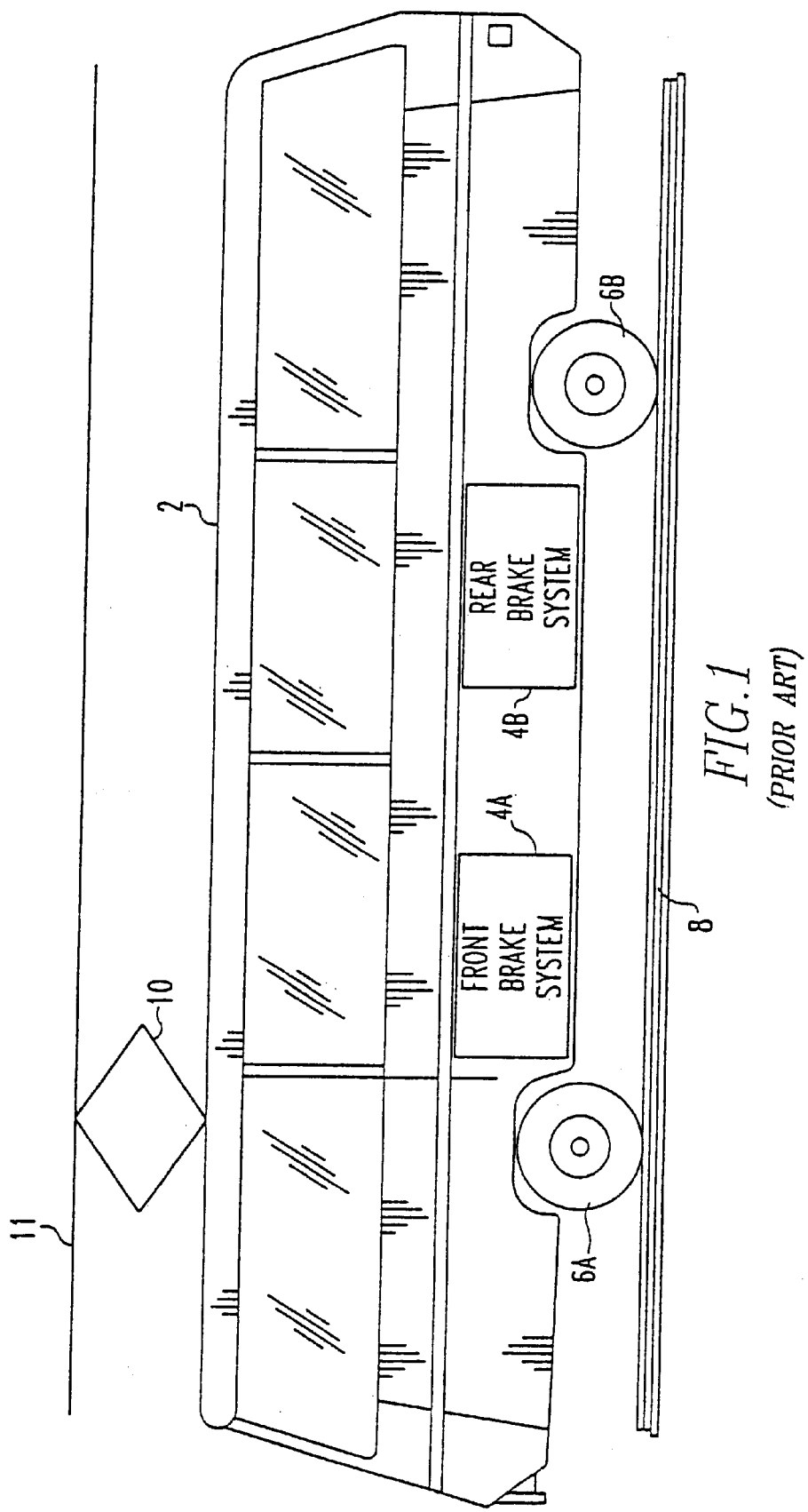
FIG. 1 is a side elevational view of an electrical powered people mover in accordance with the prior art.

With reference to FIG. 1, an electrically powered automated people mover 2 includes a front brake system 4A and a rear brake system 4B for braking front and rear wheels 6A and 6B, respectively, disposed on a running rail or a predetermined path 8. It is to be appreciated that people mover 2 has front and rear wheels (not shown) disposed on an opposite side thereof and in contact with another running rail or predetermined path. Preferably, the other wheels have dedicated brakes for applying a braking force thereto. A pantograph 11 conducts electric current from a supply line to people mover 2 for conversion into motive force which is applied to front wheel 6A and/or rear wheel 6B to propel people mover 2 along running rail or predetermined path 8.

Figure 2:
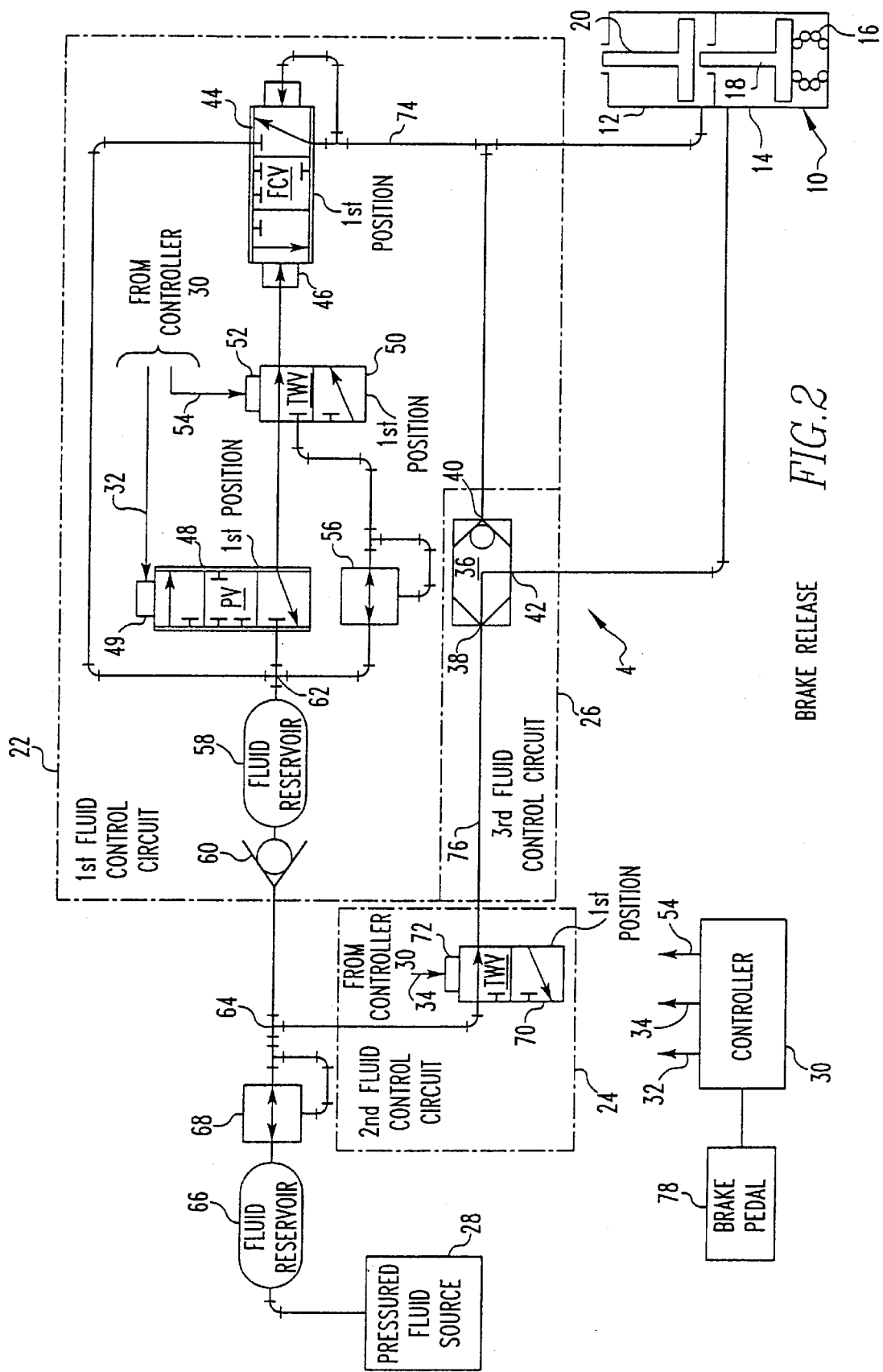
FIGS. 2–7 are circuit diagrams showing various operational states of a fluid braking system in accordance with the present invention which is utilized on the people mover shown in FIG. 1.

With reference to FIG. 2, each brake system 4 includes a dual mode brake 10 having a first fluid applied brake 12 and a second spring actuated fluid released brake 14 having a spring 16 which biases a piston 18 of second brake 14 into an extended brake actuated position in the absence of second brake 14 receiving sufficient fluid pressure on a side of piston 18 opposite spring 16. First brake 12 includes a piston 20 which can be extended into a brake actuated position by the extension of piston 18 or by application of sufficient fluid pressure to first brake 12 independent of the extension of piston 18. When the pressure of the fluid received by second brake 14 is sufficient to cause piston 18 to compress spring 16, piston 18 assumes the retracted brake release position shown in FIG. 2. When second brake 14 in the brake release position, piston 20 assumes the brake release position shown in FIG. 2 in the absence of first brake 20 receiving sufficient fluid pressure.

Each brake system 4 preferably includes a first fluid control circuit 22, a second fluid control circuit 24 and a third fluid control circuit 26. First fluid control circuit 22 is connected to controllably supply fluid to first brake 12 from a pressurized fluid source 28. Second fluid control circuit 24 is connected to controllably supply fluid to second brake 14 from pressurized fluid source 28. Third fluid control circuit 26 is connected to controllably supply fluid to second brake 14 from first fluid control circuit 22 or second fluid control circuit 24 as a function of the fluid pressure received by third fluid control circuit 26 from first fluid control circuit 22 and fluid pressure received by third fluid control circuit 26 from second fluid control circuit 24.

A controller 30 controls first fluid control circuit 22 and second fluid control circuit 24. More specifically, controller 30 supplies to first fluid control circuit 22 a first variable signal 32 which causes first fluid control circuit 22 to variably control the pressure of the fluid supplied to dual mode brake 10 and third fluid control circuit 26. Controller 30 supplies to second fluid control circuit 24 a second binary signal 34 which on/off controls the supply of fluid from the pressurized fluid source to the third fluid control circuit 26. Third fluid control circuit 26 on/off controls the fluid supplied to second brake 14 from first fluid control circuit 22 or second fluid control circuit 24. Preferably, third fluid control circuit 26 includes a double check valve 36 having an input 38 connected to second fluid control circuit 24 and an input 40 connected to first fluid control circuit 22 and first brake 12. Double check valve 36 also includes an output 42 connected to second brake 14. In operation, double check valve 36 connects output 42 to the input 38 or 40 receiving the greatest fluid pressure. Thus, if the fluid pressure received from second fluid control circuit 24 is greater than the fluid pressure received from first fluid control circuit 22, double check valve 36 connects second fluid control circuit 24 in fluid communication with second brake 14. Similarly, if the fluid pressure received from first fluid control circuit 22 is greater than the fluid pressure received from second fluid control circuit 24, double check valve 36 connects first fluid control circuit 22 in fluid communication with second brake 14.

First fluid control circuit 22 includes a flow control valve 44 connected between pressurized fluid source 28 and first brake 12 for variably controlling the pressure of the fluid supplied to first brake 12 as a function of a fluid pressure received at a control input 46 of flow control valve 44. Preferably, control input 46 is responsive to lower pressure fluid for enabling flow control valve 44 to throttle higher pressure fluid to first brake 72.

A proportional valve 48 is connected between pressurized fluid source 28 and control input 46 of flow control valve 44. Proportional valve 48 variably controls the pressure of the fluid supplied to control input 46 as a function of the value of the first signal 32 received at a control input 49 of proportional valve 48.

Preferably, a two-way valve 50 is connected to flow control valve 44, control input 46 of proportional valve 48 and pressurized fluid source 28. Two-way valve 50 has a first position where control input 46 of flow control valve 44 is in fluid communication with proportional valve 48 and a second position where control input 46 is in fluid communication with pressurized fluid source 28. Two-way valve 50 has a control input 52 connected to receive from controller 30 a third binary signal 54 which selectively switches two-way valve 50 between the first position, shown in FIG. 2, and the second position, shown in FIG. 4.

A pressure regulator 56 can be connected between pressurized fluid source 28 and two-way valve 50. Flow control valve 44, proportional valve 48 and pressure regulator 56 each have an input connected to a node 62 which is connected to pressurized fluid source 28. Pressure regulator 56 reduces the pressure of the fluid supplied to two-way valve 50 from node 62.

First fluid control circuit 22 and second fluid control circuit 24 each have an input connected to a node 64 which is connected to pressurized fluid source 28. Preferably, a fluid reservoir 58 and a check valve 60 are connected in series between nodes 62 and 64 and a fluid reservoir 66 and a pressure regulator 68 are connected in series between pressurized fluid source 28 and node 64.

Second fluid control circuit 24 includes a two-way valve 70 connected between the pressurized fluid source 28 and third fluid control circuit 26. Two-way valve 70 has a first position, shown in FIG. 2, where pressurized fluid source 28 is in fluid communication with third fluid control circuit 26 and a second position, shown in FIG. 4, where third fluid control circuit 26 is fluidly isolated from pressurized fluid source 28. Two-way valve 70 has a control input 72 connected to receive second signal 34 from controller 30. Second signal 34 causes two-way valve 70 to switch between the first position and the second position.

Under normal brake release conditions, when people mover 2 is accelerating, moving at a constant velocity or de-accelerating absent braking effort, controller 30 configures brake system 4 in a brake release mode. In the brake release mode, controller 30 sets proportional valve 48 and two-way valve 50 to the first position thereby isolating control input 46 of flow control valve 44 from pressurized fluid source 28. Controller 30 also sets two-way valve 70 to the first position thereby connecting input 38 of double check valve 36 in fluid communication with pressurized fluid source 28. When control input 46 of flow control valve 44 is fluidly isolated from pressurized fluid source 28, flow control valve 44 assumes its first position shown in FIG. 2 whereby a first fluid path 74, which connects flow control valve 44 to input 40 of double check valve 36 and first brake 12, is fluidly isolated from pressurized fluid source 28. In response to connecting pressurized fluid source 28 to input 38 and isolating pressurized fluid source 28 from input 40, double check valve 36 connects input 38 to output 42 thereby connecting pressurized fluid source 28 in fluid communication with second brake 14. The pressure of the fluid supplied to second brake 14 from pressurized fluid source 28 urges piston 18 into the retracted brake release position compressing spring 16. Similarly, isolating first brake 12 from pressurized fluid source 28 causes piston 20 to assume its retracted brake release position.

Figure 3:
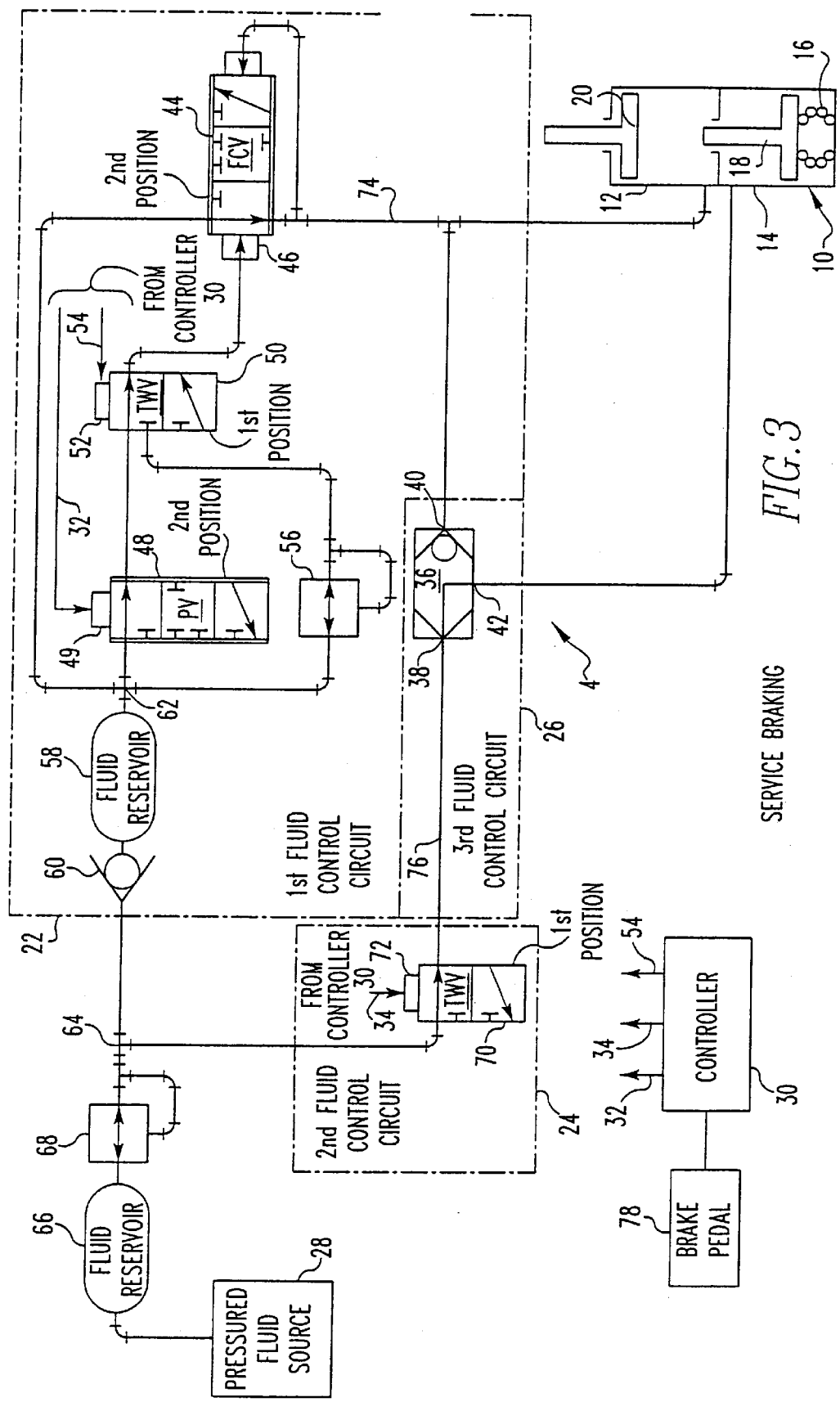

With reference to FIG. 3, under normal service braking conditions, controller 30 configures brake system 4 in a service braking mode. In the service braking mode, the extent of user actuation of a brake pedal 78 is detected by controller 30. In response to actuation of brake pedal 78, controller 30 initially sets two-way valves 50 and 70 to their first position and sets flow control valve 44 and proportional valve 48 to their second position.

When two-way valve 50 and proportional valve 48 are in their second position, control input 46 of flow control valve 44 is fluidly connected to proportional valve 48 and user actuation of brake pedal 78 causes controller 30 to adjust the value of first signal 32 supplied to control input 49 of proportional valve 48. In response to adjustment of the value of control signal 32, proportional valve 48 throttles or varies the pressure of the fluid supplied to control input 46 of flow control valve 44.

More specifically, first signal 32 initially causes proportional valve 48 to change from its first position shown in FIG. 2 to its second position shown in FIG. 3. Thereafter, first signal 32 causes proportional valve 48 to throttle or vary the pressure of the fluid supplied to control input 46 of flow control valve 44 as a function of the value of first signal 32. Flow control valve 44 also operates as a throttle to vary the pressure of the fluid supplied to first fluid path 74 as a function of variances of the pressure of the fluid supplied to control input 46.

Preferably, the pressure of the fluid supplied to control input 46 from proportional valve 48 is less than the pressure of the fluid supplied to first fluid path 74 from flow control valve 44. Moreover, the maximum pressure of the fluid supplied to first fluid path 74 from flow control valve 44 is preferably less than the pressure of the fluid supplied to second fluid path 76 via two-way valve 70. Under this circumstance, output 42 of double check valve 36 is connected to input 38 thereby connecting second brake 14 to pressurized fluid source 28 via second fluid path 76. The pressure of the fluid supplied to second brake 14 by pressurized fluid source 28 via second fluid path 76 is sufficient to urge and/or maintain piston 18 in its retracted brake release position compressing spring 16. In contrast, the variable pressure of the fluid supplied by flow control valve 44 to first path 74 causes piston 20 to extend into a brake actuated position where the brake pressure applied by piston 20 is related to the pressure of the fluid supplied to first fluid path 74.

Figure 4:
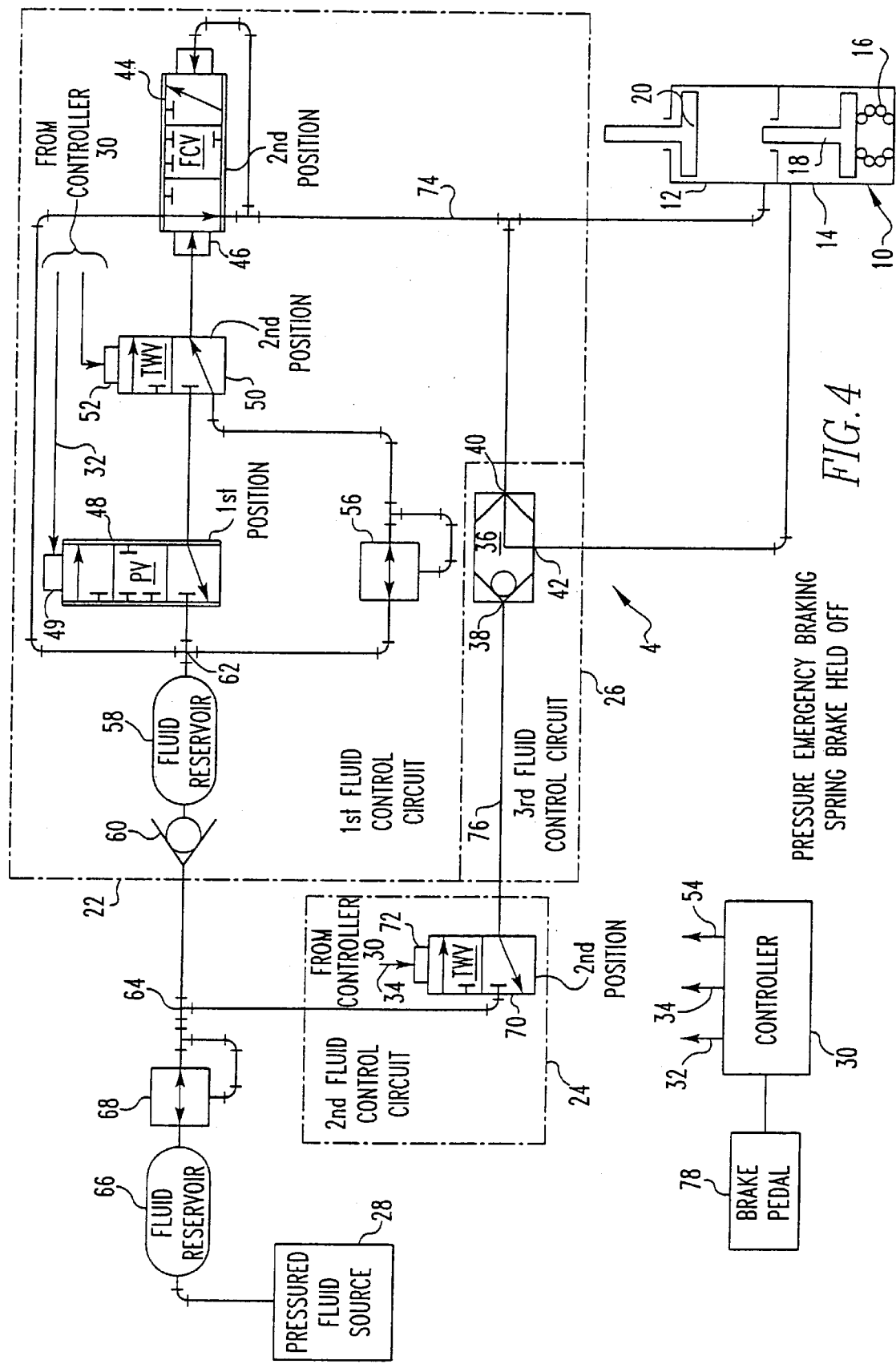

With reference to FIG. 4, if the braking effort requested by brake pedal 78 exceeds the braking effort that can be supplied by brake system 4 in the service braking mode, controller 30 causes valves 44, 50 and 70 to assume their respective second position and causes valve 48 to assume its first position. When two-way valve 50 is in its second position, control input 46 is connected to node 62 via pressure regulator 56. Pressure regulator 56 reduces the pressure of the fluid supplied to control input 46 from pressurized fluid source 28 to avoid supplying fluid pressure in excess of the maximum fluid pressure control input 46 is configured to receive. If control input 46 is configured to receive the pressure of the fluid supplied by pressurized fluid source 28, pressure regulator 56 can be omitted from first fluid control circuit 22. Preferably, the pressure of the fluid supplied to control input 46 when two-way valve 50 in its second position is preferably greater than the maximum fluid pressure applied to control input 46 from proportional valve 48 when two-way valve 50 is in its first position. The pressure of the fluid supplied to control input 46 when two-way valve 50 is in its second position causes flow control valve 44 to assume an open full throttle position whereby the fluid supplied to first fluid path 74 at a maximum pressure related to the pressure of the fluid at node 62.

When two-way valve 70 is in its second position, second fluid path 76 is fluidly isolated from node 64. Under this circumstance, the fluid pressure in first fluid path 74 causes output 42 of double check valve 36 to be connected to input 40, thereby connecting second brake 14 in fluid communication with first fluid path 74. With both first brake 12 and second brake 14 are connected in fluid communication with first fluid path 74, piston 20 assumes its extended brake actuated position and piston 18 assumes its retracted brake release position compressing spring 16. Since flow control valve 44 supplies fluid at a maximum pressure to first fluid path 74, piston 20 applies a maximum fluid braking effort of brake system 4.

Figure 5:
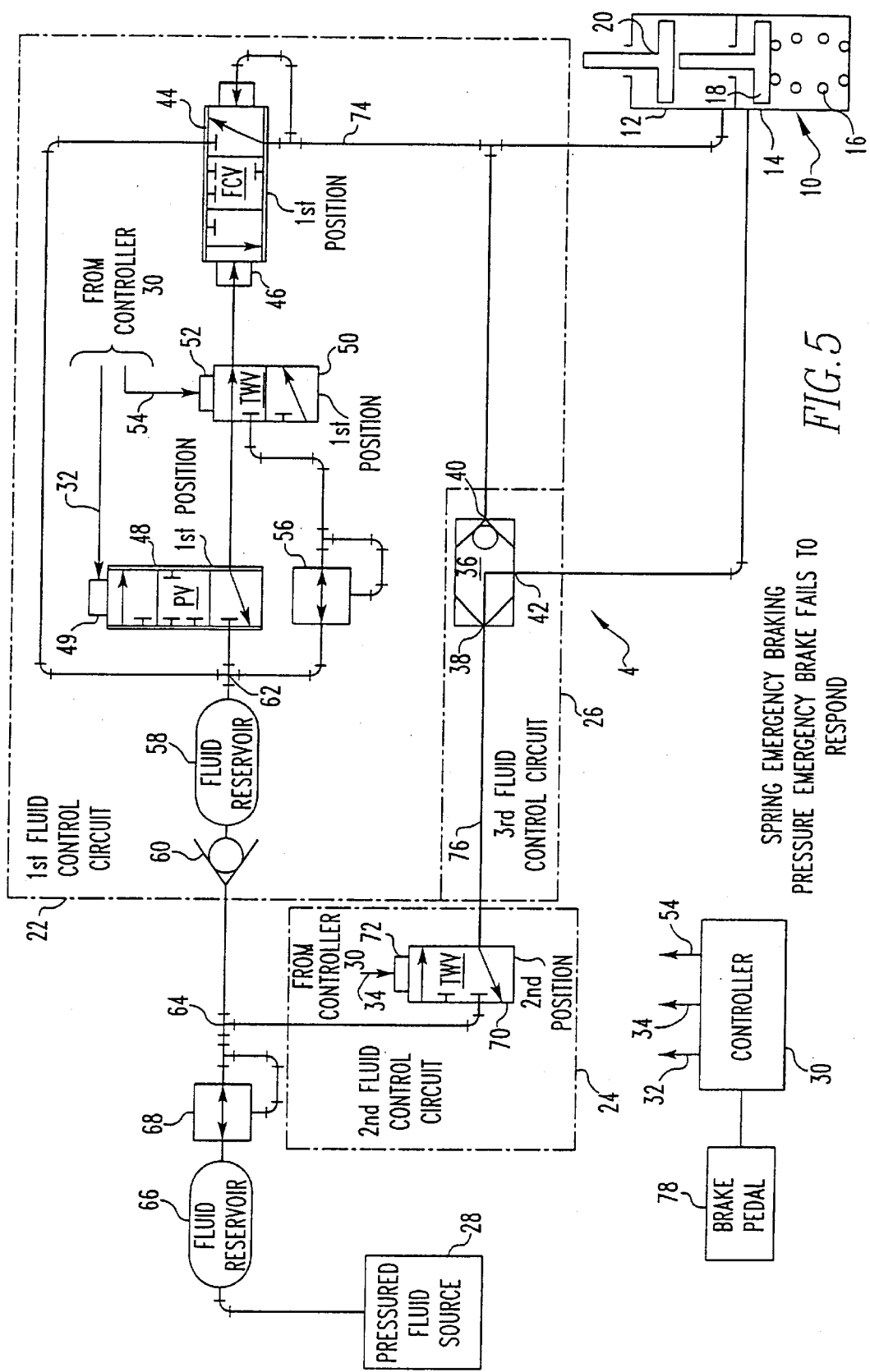

With reference to FIG. 5, when controller 30 requests brake system 4 to enter the pressure emergency braking mode shown in FIG. 4 and flow control valve 44 fails to assume its second position, first fluid path 74 is fluidly isolated from pressurized fluid source 28. Under this circumstance, second brake 14 will not receive sufficient fluid pressure to cause piston 18 to assume its retracted brake release position compressing spring 16. Thus, spring 16 will extend pistons 18 and 20 into their extended brake actuated position where the braking effort is related to the spring force applied to pistons 18 and 20 by spring 16.

Figure 6:
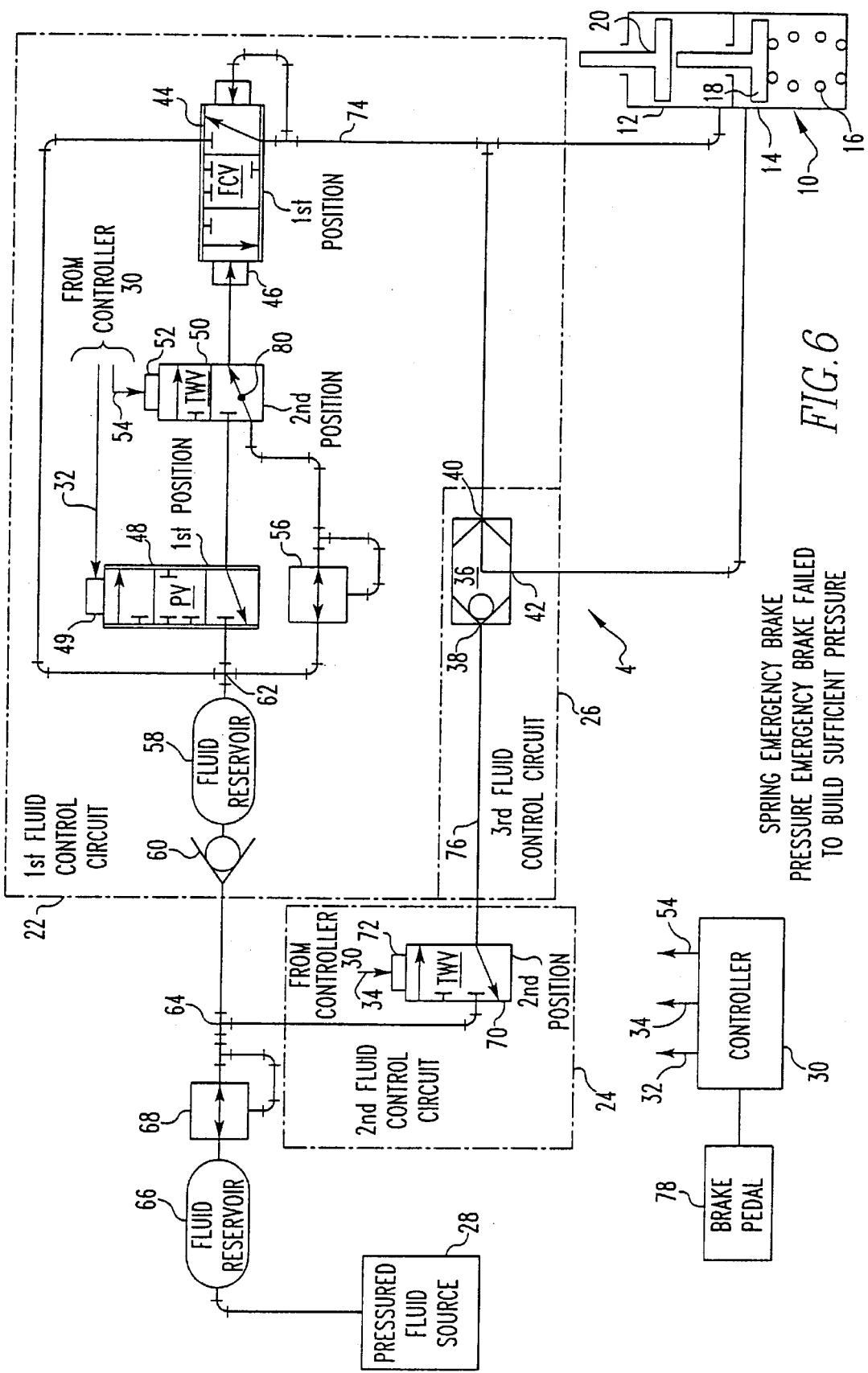

With reference to FIG. 6, when controller 30 requests brake system 4 to enter the pressure emergency braking mode shown in FIG. 4 and two-way valve 50 has a blockage 80 which prevents control input 46 from receiving sufficient fluid pressure to cause flow control valve 44 to assume its second position, first fluid path 74 is fluidly isolated from pressurized fluid source 28. Under this circumstance, second brake 14 will not receive sufficient fluid pressure to maintain piston 18 in its retracted brake release position compressing spring 16. Thus, spring 16 will extend pistons 18 and 20 into their extended brake actuated position where the braking effort is related to the spring force applied to pistons 18 and 20 by spring 16.

Figure 7:
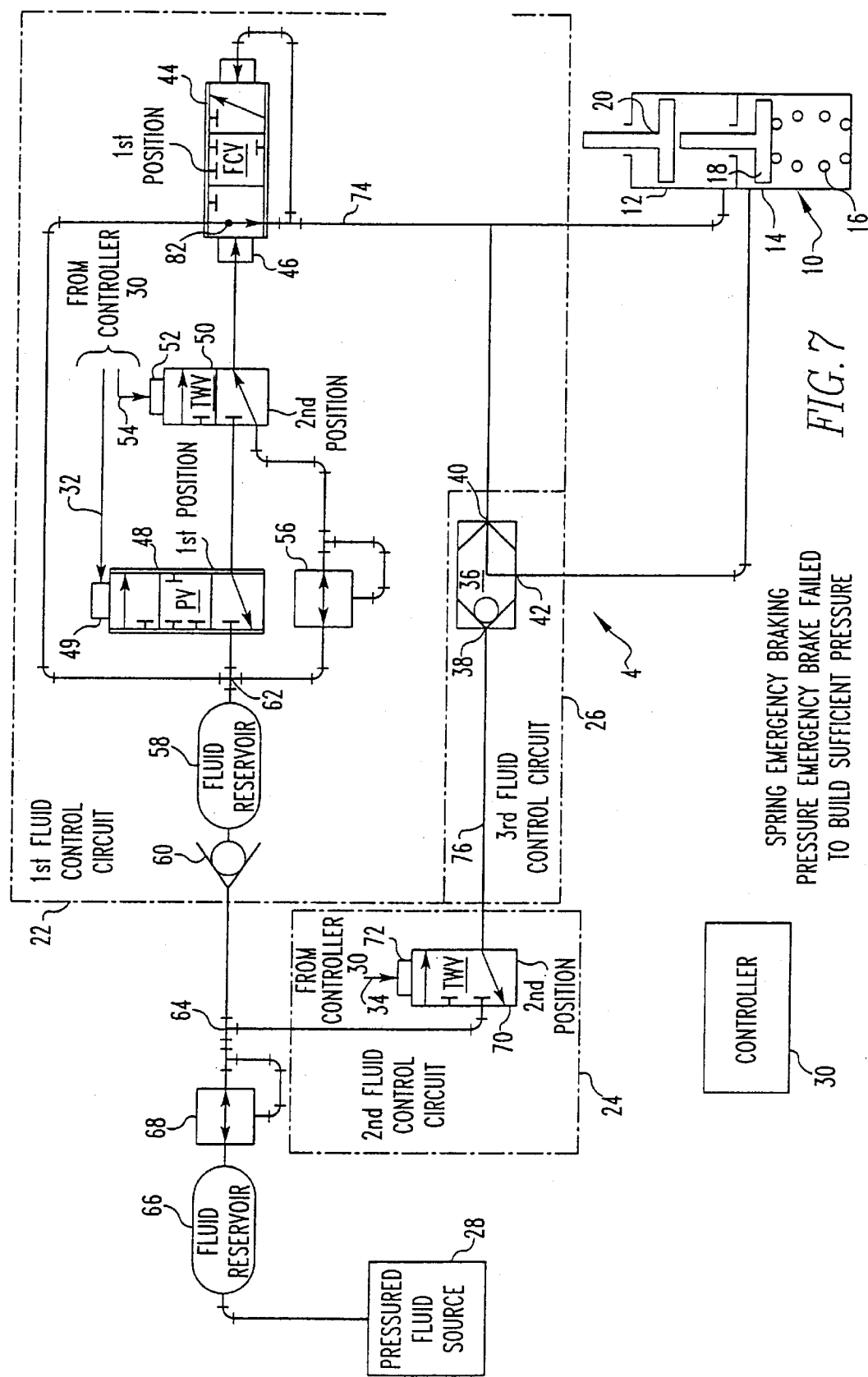

With reference to FIG. 7, when controller 30 requests brake system 4 to enter the pressure emergency braking mode shown in FIG. 4 and flow control valve 44 has a blockage 82 that at least partially isolates first fluid path 74 from pressurized fluid source 28, spring 16 will extend pistons 18 and 20 into their extended brake actuated position where the braking effort is related to the spring force applied to pistons 18 and 20 by spring 16. If blockage 82 enables sufficient fluid to flow into first fluid path 74 to supply sufficient fluid pressure to piston 18 to compress spring 16, sufficient fluid pressure will also be supplied to piston 20 to maintain it in its extended brake actuated position where the applied braking effort is related to the pressure of the fluid supplied to brake 12.

As can be seen, the present invention provides a brake system 4 and a method of use thereof that provides spring emergency braking in the absence of sufficient fluid pressure when controller 30 requests brake system 4 to enter its normal pressure emergency braking mode.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A dual mode brake system for a vehicle, the brake system comprising:
    a first fluid actuated brake;
    a second spring actuated fluid released brake configured to spring actuate the first brake in the absence of receiving sufficient fluid pressure at the second brake;
    a first fluid control circuit which controllably supplies fluid to the first brake from a source of pressurized fluid;
    a second fluid control circuit which controllably supplies fluid to the second brake from the source of pressurized fluid; and
    a third fluid control circuit which controllably supplies fluid to the second brake from the first fluid control circuit or the second fluid control circuit as a function of a pressure of the fluid supplied to the third fluid control circuit from the first fluid control circuit and a pressure of the fluid supplied to the third fluid control circuit from the second fluid control circuit.

2. The dual mode brake system as set forth in claim 1, further including a controller for controlling the first fluid control circuit and the second fluid control circuit, wherein:
    the first fluid control circuit variably controls the pressure of the fluid supplied thereby as a function of a first signal from the controller;
    the second fluid control circuit on/off controls the fluid supplied thereby as a function of a second signal from the controller; and
    the third fluid control circuit on/off controls the fluid supplied to the second brake from the first fluid control circuit or the second fluid control circuit.

3. The dual mode brake system as set forth in claim 2, wherein the first fluid control circuit includes:
    a flow control valve connected between the source of pressurized fluid and the first brake for variably controlling the pressure of the fluid supplied from the source of pressurized fluid to the first brake as a function of a pressure of fluid supplied to a control input of the flow control valve; and
    a proportional valve connected between the source of pressurized fluid and the control input of the flow control valve for variably controlling the pressure of the fluid supplied to the control input of the flow control valve as a function of the first signal.

4. The dual mode brake system as set forth in claim 3, wherein:

the first fluid control circuit further includes a first two-way valve connected to the flow control valve, the proportional valve and the source of pressurized fluid;

the first two-way valve has a first position where the control input of the flow control valve is in fluid communication with the proportional valve and a second position where the control input of the flow control valve is in fluid communication with the source of pressurized fluid; and the first two-way valve has a control input connected to receive a third signal from the controller, the third signal selectively switching the first two-way valve between the first position and the second position.

5. The dual mode brake system as set forth in claim 4, wherein:

the first signal is continuously variable; and the second and third signals are binary.

6. The dual mode brake system as set forth in claim 3, wherein:

the first fluid control circuit further includes a pressure regulator which is in fluid communication between the control input of the fluid control valve and the source of pressurized fluid when the first two-way valve is in the second position; and the pressure regulator reduces the pressure of the fluid supplied to the control input of the fluid control valve when the first two-way valve is in the second position.

7. The dual mode brake system as set forth in claim 2, wherein:

the second fluid control circuit includes a second two-way valve connected between the source of pressurized fluid and the third fluid control circuit;

the second two-way valve has a first position where the source of pressurized fluid is in fluid communication with the third fluid control circuit and a second position where the third fluid control circuit is fluidly isolated from the source of pressurized fluid; and the second two-way valve has a control input connected to receive the second signal from the controller, with the second signal selectively switching the second two-way valve between the first position and the second position.

8. The dual mode brake system as set forth in claim 2, wherein:

the third fluid control circuit includes a double check valve having (i) one input connected to the second fluid control circuit, (ii) another input connected to the first fluid control circuit and the first brake and (iii) an output connected to the second brake; and the double check valve fluidly connects the input thereof receiving the greatest fluid pressure to the output of the double check valve.

9. The dual mode brake system as set forth in claim 1, having the following modes of operation:

a brake release mode where the first fluid control circuit withholds fluid from the first brake and the second brake receives fluid from the second fluid control circuit via the third fluid control circuit;

a service braking mode where the first brake receives from the first fluid control circuit fluid having a pressure corresponding to a desired braking effort of the first brake, the second brake receives fluid from the second fluid control circuit via the third fluid control circuit and the pressure of the fluid received by the first brake is less than the pressure of the fluid received by the second brake;

a pressure emergency braking mode where the first brake receives fluid from the first fluid control circuit, the second brake receives fluid from the first fluid control circuit via the third fluid control circuit and the second fluid control circuit fluidly isolates the source of pressurized fluid from the third fluid control circuit; and a spring emergency braking mode where the first fluid control circuit and the second fluid control circuit do not supply sufficient fluid to the second brake to compress a spring thereof whereby the spring actuates the second brake which provides a spring braking effort.

10. The dual mode brake system as set forth in claim 9, wherein the spring braking effort corresponds to the force of the spring.

11. The dual mode brake system as set forth in claim 4, wherein in response to the second fluid control circuit withholding fluid from the third fluid control circuit and the first two-way valve malfunctioning whereby the flow control value does not supply sufficient fluid to the second brake to maintain a spring thereof compressed, the spring actuates the second brake which provides a spring braking effort.

12. The dual mode brake system as set forth in claim 11, wherein the malfunction of the first two-way valve includes a blockage in the fluid path between the control input of the flow control valve and the source of pressurized fluid when the two-way valve is in the second position.

13. The dual mode brake system as set forth in claim 4, wherein in response to the second fluid control circuit withholding fluid from the third fluid control circuit and the flow control valve malfunctioning whereby the flow control valve does not supply sufficient fluid to the second brake to maintain a spring thereof compressed, the spring actuates the second brake which provides a spring braking effort.

14. The dual mode brake system as set forth in claim 13, wherein:

a first malfunction of the flow control valve includes a failure to initiate fluidly connecting the first brake and the third fluid control circuit to the source of pressurized fluid in response to receiving sufficient fluid at the control input of the flow control valve; and a second malfunction of the flow control valve includes an blockage in the fluid path between (i) the source of pressurized fluid and (ii) the first brake and the third fluid control circuit when the flow control valve connects the first brake and the third fluid control circuit to the source of pressurized fluid in response to receiving sufficient fluid at the control input of the flow control valve.

15. A method of controlling a dual braking system that includes a first fluid actuated brake and a second spring actuated fluid released brake, the method comprising the steps of:

(a) supplying a variable signal to a dual braking system;

(b) supplying fluid to a first fluid actuated brake along a first fluid path at a pressure related to a value of the variable signal;

(c) supplying a first binary signal to the dual braking system; and (d) when the first binary signal is in one state, supplying fluid to a second spring actuated fluid released brake along a second fluid path at a pressure sufficient to maintain the second brake in its release state.

16. The method as set forth in claim 15, wherein the variable signal is variable between a first value where the pressure of the fluid in the first fluid path causes the first brake to apply a first braking effort and a second value where the pressure of the fluid in the first fluid path causes the first brake to apply a second braking effort greater than the first braking effort.

17. The method as set forth in claim 16, further including the steps of:

when the first binary signal is in another state, withholding fluid from the second fluid path; and fluidly connecting the second brake to the first fluid path to maintain the second brake in its release state.

18. The method as set forth in claim 17, further including the step of reducing the pressure of the fluid supplied to the second brake so that a spring of the second brake actuates the second brake.

19. The method as set forth in claim 15, further including the step of supplying a second binary signal to the dual braking system, wherein:

when the second binary signal is in one state, the pressure of the fluid in the first fluid path is related to the value of the variable signal; and when the second binary signal is in another state, the pressure of the fluid in the first fluid path is set to a fixed pressure.

20. The method as set forth in claim 19, wherein the fixed pressure is less than or equal to the pressure of the fluid in the second fluid path.

* * * * *